(No Model.)
B. F. PINSON, Jr.
HORSESHOEING IMPLEMENT.
No. 275,698. Patented Apr. 10, 1883.
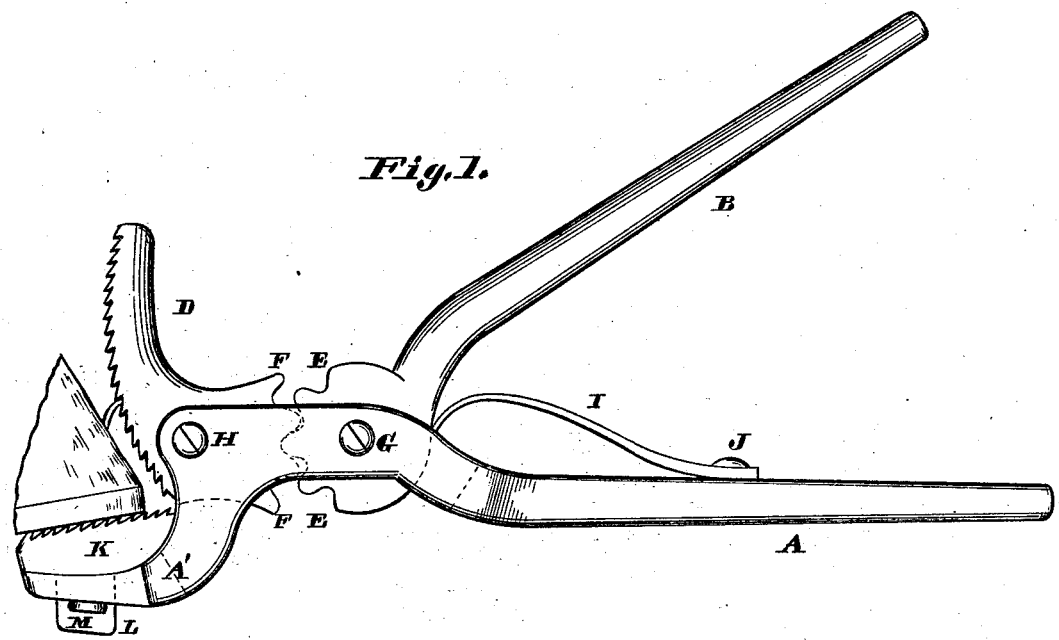
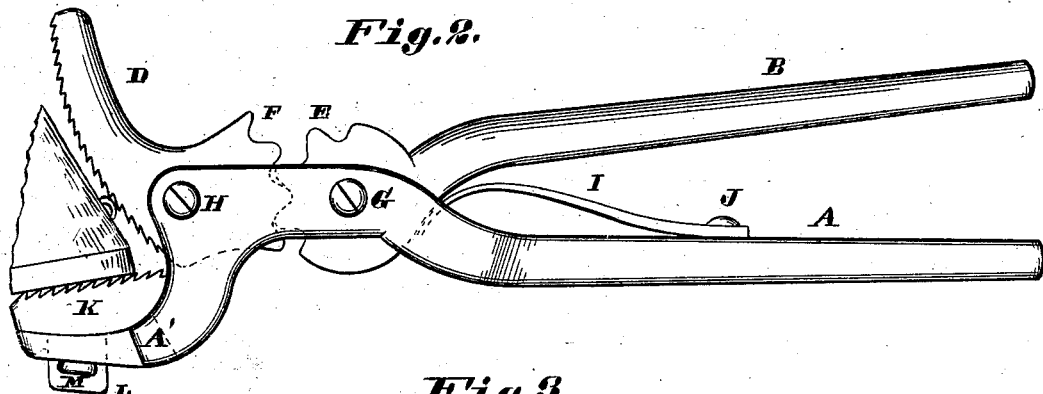
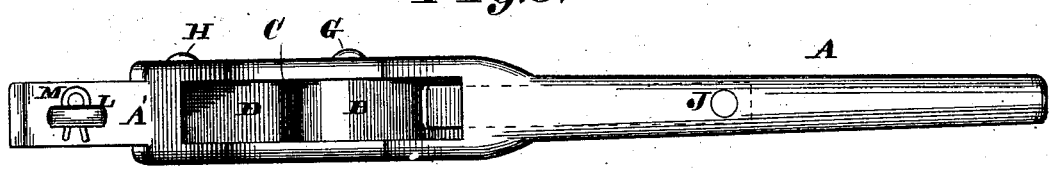
Attest:
Wm. F. Sayers
D. W. Hopkins
Inventor:
Benj. F. Pinson Jr.
By Knight Bros
attys

UNITED STATES PATENT OFFICE.

BENJAMIN F. PINSON, JR., OF SULLIVAN, MISSOURI.

HORSESHOEING IMPLEMENT.

SPECIFICATION forming part of Letters Patent No. 275,698, dated April 10, 1883.

Application filed January 20, 1883. (No model.)

*To all whom it may concern:*

Be it known that I, BENJAMIN F. PINSON, Jr., of Sullivan, in the county of Franklin and State of Missouri, have invented a certain new and useful Improvement in Horseshoeing Implements, of which the following is a full, clear, and exact description, reference being had to the accompanying drawings, forming part of this specification, and in which—

Figure 1 is a side elevation with the instrument in its open position. Fig. 2 is a similar view, the instrument being nearly closed; and Fig. 3 is a bottom view.

My invention relates to an implement for clinching nails in shoeing horses; and my invention consists in points of novelty hereinafter fully described and claimed.

Referring to the drawings, A represents one of the handles of the implement, and B the other. In the forward portion of the part A is a slot or mortise, C, in which is pivoted the forward end of the handle or part B and a segmental block, D, the block being serrated or notched on its convex or outer surface, and the two engaging by means of cogs E F, formed respectively on their adjacent portions, substantially as shown. They (the handle B and block D) are secured in the mortise of the part A by suitable rivets, screws, or small bolts, G H; and it will thus be seen that when the part B is moved or pressed toward the part A a downward, slightly-forward movement will be imparted to the forward portion of the block D. The handles are preferably held apart, when not forced together, by a spring, I, secured to one of them by a suitable rivet, J, and pressing against the other, as shown. The forward end of the part A extends forward and downward from the point of pivot of the block D, forming a projection, A', which is either notched on its upper portion or has secured to it a notched block, K, which bears beneath the shoe when clinching a nail, as shown. I prefer to use the block, and to make it removable, so that it can be taken off and sharpened or replaced by a larger or smaller one, as necessity may require. I have shown it with a stem, L, which passes through a slot in the projection A', and held in by a suitable key or pin, M.

I claim as my invention—

1. In an implement for shoeing horses, the combination of handle A, downward and forward projection A', handle B, pivoted to the handle A, and having cogs E, and serrated block D, pivoted to the handle A, and having cogs F, engaging with those E of the handle B, substantially as shown and described, for the purpose set forth.

2. In an implement for shoeing horses, the combination of handles A B, pivoted together and extending laterally, block D, pivoted to the handle A, and having cogs engaging with cogs of the handle B, and notched block K, secured to a lateral projection, A', of the handle, substantially as and for the purpose set forth.

3. In an implement for shoeing horses, the notched block K, with stem or shank L, fitting in a slot of the projection A' of the handle A, and key M for holding the block in place, all substantially as shown and described, for the purpose set forth.

BENJAMIN F. PINSON, JR.

Witnesses:
WILLIAM Z. PINSON,
CHARLES D. SATTERFIELD.